United States Patent [19]

Kim

[11] Patent Number: 5,471,202
[45] Date of Patent: Nov. 28, 1995

[54] ROTATION SENSING DEVICE FOR DETECTING A FINE DISPLACEMENT OF A HANDLE AND CONTROL SYSTEM IN ELECTRICAL POWER STEERING DEVICE

[75] Inventor: Chang-Soo Kim, Taeku, Rep. of Korea

[73] Assignee: Samsung Heavy Ind. Co. Ltd., Kyung-Nam, Rep. of Korea

[21] Appl. No.: 201,630

[22] Filed: Feb. 25, 1994

[51] Int. Cl.[6] .................................................. G08B 21/00
[52] U.S. Cl. ......................... 340/672; 361/296; 361/298.1
[58] Field of Search ..................................... 340/672, 679; 324/658, 686; 180/142, 79.1, DIG. 1; 361/298.1, 296, 292, 287, 277; 307/10.1; 318/508

[56] References Cited

U.S. PATENT DOCUMENTS 3,700,983 10/1972 Goetzl ................................. 361/296 X
3,854,181 12/1974 Matsuwake et al. ............ 361/298.1 X Primary Examiner—John K. Peng
Assistant Examiner—Thomas J. Mullen, Jr.
Attorney, Agent, or Firm—Lieberman & Nowak

[57] ABSTRACT

A rotation sensing device for detecting a fine displacement of a handle and control system for use in an electrical power steering device in vehicles and a motor driving device in industrial machines. The rotation sensing device has a fixing member with a support plate and a plurality of polarity plates fixed to one side of the support plate at a predetermined interval, and a dielectric member with a plurality of dielectric plates fixed to one side of a handle shaft of the handle at a predetermined interval and movingly inserted into the interval between each of the polarity plates. Therefore, the capacitance of the dielectric member can be variable based on a mechanical displacement of the handle.

2 Claims, 3 Drawing Sheets

Prior Art

Fig. 2(A)
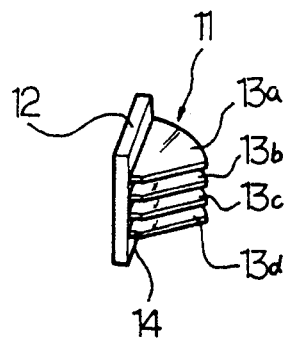
Fig. 2(B)
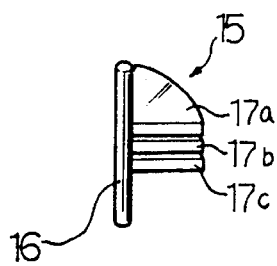
Fig. 2(C)
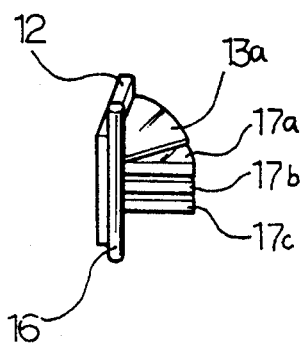
Fig. 2(D)
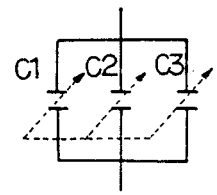
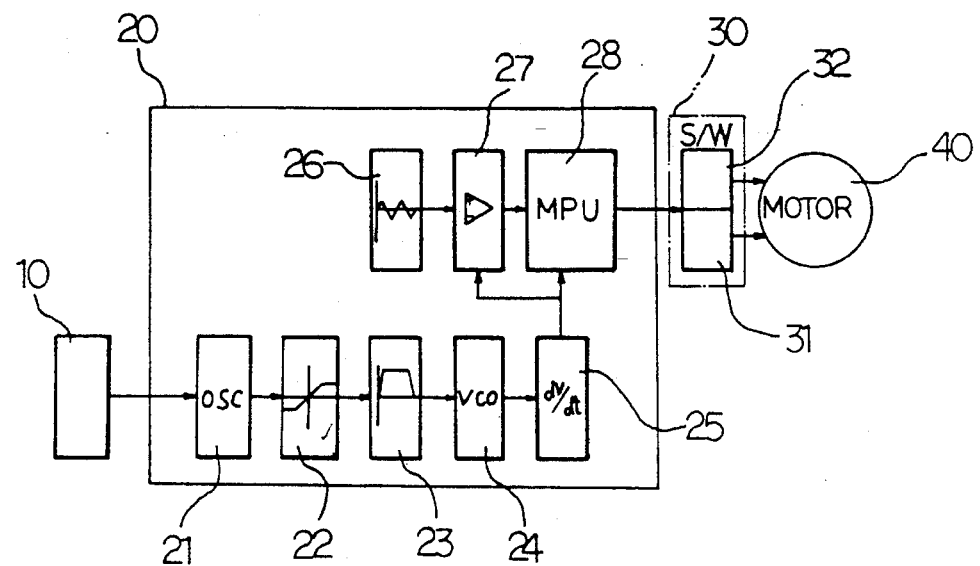
FIG. 3

ROTATION SENSING DEVICE FOR DETECTING A FINE DISPLACEMENT OF A HANDLE AND CONTROL SYSTEM IN ELECTRICAL POWER STEERING DEVICE

BACKGROUND OF THE INVENTION

1. Field of the Invention

The present invention relates to rotation sensing device for detecting a fine displacement of a handle and control system for use in an electrical power steering device in vehicles and a motor driving device in industrial machines.

2. Prior Art

It is well known that, in an electrical power steering device for general and industrial vehicles and a motor driving device for industrial machines, an accurate sensing of any fine displacement of a steering handle and an operating handle is absolutely needed.

Conventional rotation sensing device for detecting a fine displacement of a handle and its control system employed in a typical electrical power steering device are schematically shown in FIG. 1. This system has a known variable resistor as a rotation sensing device 10 for detecting a fine displacement of the handle(not shown), and a control unit 20 accepting input signals from the sensing device 10 and controlling a switching unit 30 with its output signals selectively to a forward running switch 31 or a backward running switch 32. Then, by this switching unit 30, an object such as a motor 40 is operated.

However, this conventional rotation sensing device and control system have the drawbacks in that they have an inferior durability and stability to vibration and external environment mainly due to the fact that they use the contact type variable resistor for its sensing device. In addition to this, the control system commits frequent malfunctions and a lot of errors in operation due to noises mixed with input signals from the sensing device.

SUMMARY OF THE INVENTION

It is an object of the present invention to provide a rotation sensing device which is capable of detecting any fine displacement of a handle with maximum accuracy by employing a variable capacitor type contactless displacement sensor.

It is another object of the present invention to provide a control system for an electrical power steering system in vehicles and a motor driving system in industrial machines which is capable of solving the above drawbacks and ensuring the operational accuracy.

According to one aspect of the present invention, there is provided a rotation sensing device for detecting a fine displacement of a handle in an electrical power steering device for vehicles and a motor driving system for industrial machines, comprising: a fixing member having a support plate and a plurality of polarity plates fixed to one side of said support plate, each of said polarity plates being spaced at a predetermined interval; and a dielectric member having a plurality of dielectric plates fixed to one side of a handle shaft of said handle, each of said dielectric plates being spaced at a predetermined interval and movingly inserted into the interval between each of said polarity plates, thereby the capacitance of said dielectric member can be variable based on a mechanical displacement of said handle.

According to another aspect of the present invention, there is provided a control system in an electrical power steering device for vehicles and a motor driving device for industrial machines, including a rotation sensor for detecting a displacement of a handle and a control unit for controlling an operation of a load based on a value acquired in said rotation sensor, said control unit comprising: an oscillator for generating a voltage proportional to an output voltage of said rotation sensor; a reference voltage generator for generating a reference voltage of constant triangular waves; an amplitude limiter connected to said oscillator and for eliminating noises from the output voltage of said oscillator; a filter connected to said amplitude limiter and for allowing only the voltage within a predetermined frequency band to pass; a voltage controlled oscillator connected to said filter and for generating a voltage proportional to an input voltage from said filter; a differential circuit connected to said voltage controlled oscillator and for differentiating an input voltage from said voltage controlled oscillator by time; a comparator for comparing an output voltage of said differential circuit with said reference voltage and generating a predetermined signal when said output voltage is higher than said reference voltage; and a microprocessor for controlling a switching unit determining an operation of said load based on said signal from said comparator.

BRIEF DESCRIPTION OF THE DRAWINGS

These and other features of the present invention will now be described in detail with reference to the accompanying drawings, in which:

FIGS. 2A–2D illustrates a construction view of a rotation sensing device for a fine displacement of a handle according to one embodiment of the present invention.

FIG. 3 illustrates a block diagram of a control system for an electrical power steering device in vehicles and a motor driving device in industrial machines according to the present invention.

FIG. 4A to 4J are graphs of various stages in the control system according to the present invention.

DETAILED DESCRIPTION OF THE PREFERRED EMBODIMENT

Figure 1:
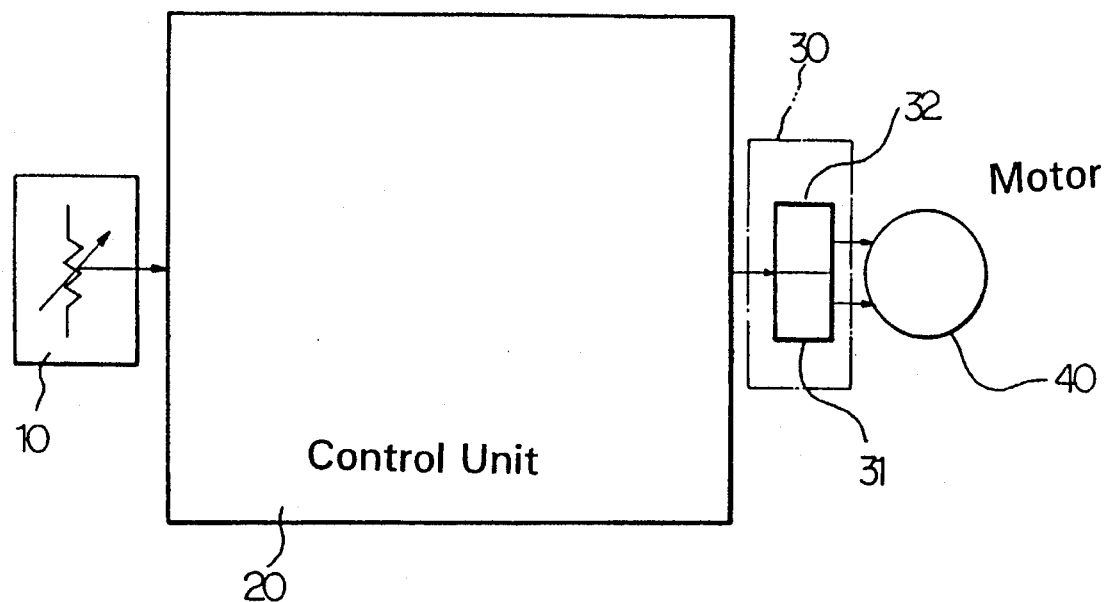
FIG. 1 illustrates a block diagram of a conventional rotation sensing device for a fine displacement of a handle and its control system used in an electrical power steering device.

FIG. 2 illustrates a construction view of a rotation sensing device according to one embodiment of the present invention. The sensing device has a fixing member 11 and a dielectric member 15.

As shown in FIG. 2A, the fixing member 11 has a support plate 12 and a plurality of polarity plates 13a to 13d which are fixed to one side of the support plate 12. Each of the polarity plates 13a to 13d has a predetermined interval therebetween, and a cutout portion 14 allowing a handle shaft 16 to be inserted therealong, when combined with the dielectric member 15.

Meanwhile, as shown in FIG. 2B, the dielectric member 15 has a plurality of dielectric plates 17a to 17c which are fixed to one side of the handle shaft 16. Each of the dielectric plates 17a to 17c has a predetermined interval therebetween.

The fixing member 11 is combined with the dielectric member 15 in such a way that the dielectric plates 17a to 17c are movingly inserted into each of the intervals between the polarity plates 13a to 13d, and thus radially telescoped to each other, as shown in FIG. 2C.

Accordingly, the contact areas of dielectric plates 17a to 17c and the polarity plates 13a to 13d are to be variable as the handle shaft 16 rotates.

FIG. 2D shows a circuit which is equivalent to the dielectric member 15 provided with three dielectric plates 17a to 17c. In this case, three dielectric plates 17a to 17c are substituted by three capacitors c1 to c3 connected in parallel to each other.

Referring to FIG. 3 illustrating the schematic block diagram of a control system of the present invention, the output of the rotation sensing device 10 is connected to an oscillator 21, and then to an amplitude limiting circuit 22. The output of the amplitude limiting circuit 22 is connected to a differential circuit 25 through a filter 23 and a voltage controlled oscillator 24. The output of the differential circuit 25 is connected to a comparator 27, and then to a microprocessor 28. Additionally, a reference voltage generating circuit 26 is connected to the microprocessor 28 through the comparator 27. The output of the microprocessor 28 is connected to a load 40 such as for example a motor through a switching unit 30.

In operation, the contact area between the polarity plates 13a to 13d and the dielectric plates 17a to 17c is changed by the rotation of the handle shaft 16, and thus, the capacitance of the dielectric member 15 varies.

It is known that the capacitance is given as $c=\rho(s/d)$, where $\rho$ is the dielectric constant, s is the surface areas of the polarity plates, and d is the distance between the polarity plates. If both values of the distance d and the surface area s are fixed, the capacitance c of the capacitors c1 to c3 can be derived based on the change of the dielectric constant $\rho$. Accordingly, based on this mechanical displacement of the handle, the dielectric volume between the polarity plates 13a to 13d is changed, and thus the capacitance of the capacitors c1 to c3 can be varied.

Figure 4A:
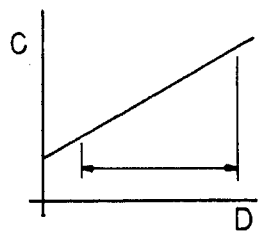

FIG. 4A is a graph showing the capacitance change of the capacitors c1 to c3 depending on the displacement of a handle, in which a stable area is set to be used as an output.

The rotation sensing device 10 applies to the oscillator 21 of the control unit 20 an output voltage in response to the capacitance change based on the rotating motion of the handle shaft 16. Thus, the frequency proportional to the output voltage of the rotational sensing device 10 is generated in the oscillator 21.

Figure 4B:
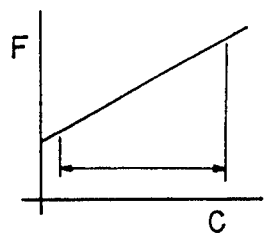

FIG. 4B is a graph showing a frequency displacement which corresponds to the capacitance change when the output voltage from the rotation sensing device 10 passes through the oscillator 21 of the control unit 20.

As shown in FIG. 4B, upon adjustment of the frequency displacement width, it is possible to control the resolution of the rotation sensing device 10. Also, as the range of the frequency displacement increases, the output of the sensing device 10 can be processed in the more stable state.

In the meanwhile, the output of the oscillator 21 is processed in the following ways to enhance its stability.

That is, firstly, the peak value of the wave form which is more or less than a predetermined value is eliminated by the amplitude limiting circuit 22, thus to prevent any distortion due to the superposition or interference of wave forms by an external noise. Secondly, the frequency component generated in the unstable area among displacement values is eliminated through the filter 23.

With the two steps described in the above, it is possible to eliminate the interference and distortion components generated by external environment and electromagnetic system and acquire the more stable output.

Figure 4C:
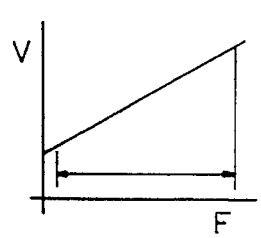

Then, as shown in FIG. 4C, the output frequency is converted to its proportional form of a voltage when passing through the voltage controlled oscillator 24, and at this time of conversion, the resolution of the sensing device 10 can be adjusted again based on the variable voltage area.

Figure 4D:
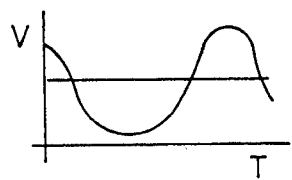
Figure 4E:
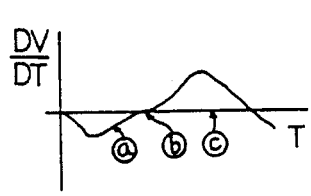

The output voltage of the voltage controlled oscillator 24 is differentiated by time in the differential circuit 25 as shown in FIG. 4D and FIG. 4E. The output of the differential circuit 25 is then applied to the microcomputer 28 and the comparator 27.

Then, the microprocesser 28 determines whether or not the switching unit 30 should be enabled, and the comparator 27 compares the output of the differential circuit 25 with a triangular wave(reference voltage) generated in the reference voltage generating circuit 26.

In detail, the output of the differential circuit 25 can be divided into three cases as follows(see FIG. 4E);

1) Voltage reducing area(negative value-reference numeral a)

2) No change area(zero value-reference numeral b)

3) Voltage increasing area(positive value-reference numeral c)

The microprocessor 28 analyzes these three cases in such a way that case 1 is an area for enabling a backward switch, case 3 is an area for enabling a forward switch, and case 2 is a neutral area for enabling neither the backward switch nor the forward switch.

Figure 4F:
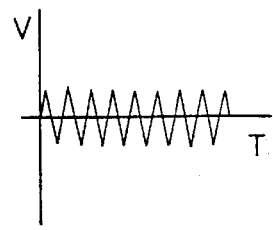
Figure 4G:
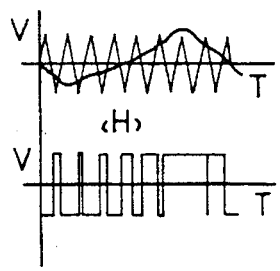

In the meanwhile, the triangular wave shown in FIG. 4F which is generated from the reference voltage generator 26 is applied to a negative terminal of the comparator 27, and the output from the differential circuit 25 shown in FIG. 4E is applied to a positive terminal, so that the comparator 27 compares these two input signals as shown in FIG. 4G and generates a predetermined pulse in the area that the differentiated signals and the triangular wave signals are supercomposed to each other, as shown in FIG. 4H.

Figure 4I:
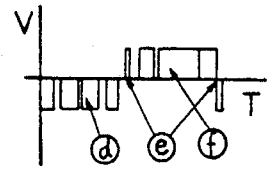

Therefore, the microprocessor 28 adds the output signals of the comparator 27 and the differential circuit 25, and generates a signal for enabling the switching unit 30 as shown in FIG. 4I. At this time, a negative pulse d is applied to the backward switch 31, and a positive pulse f is applied to the forward switch 39. And at the point with no voltage change such as e, neither the forward switch nor the backward switch is enabled.

Figure 4J:
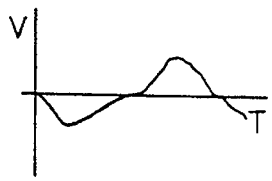

FIG. 4J illustrates an actual current value in the load 40 when it is driven by the switches 31 and 32 enabled by the pulse from the microprocessor 28. When driving a precision load such as a motor, it is possible to obtain a precision output by increasing the output frequency (i.e., by increasing the frequency of the triangular wave applied to the comparator 27) of the microprocessor 28.

Figure 5:
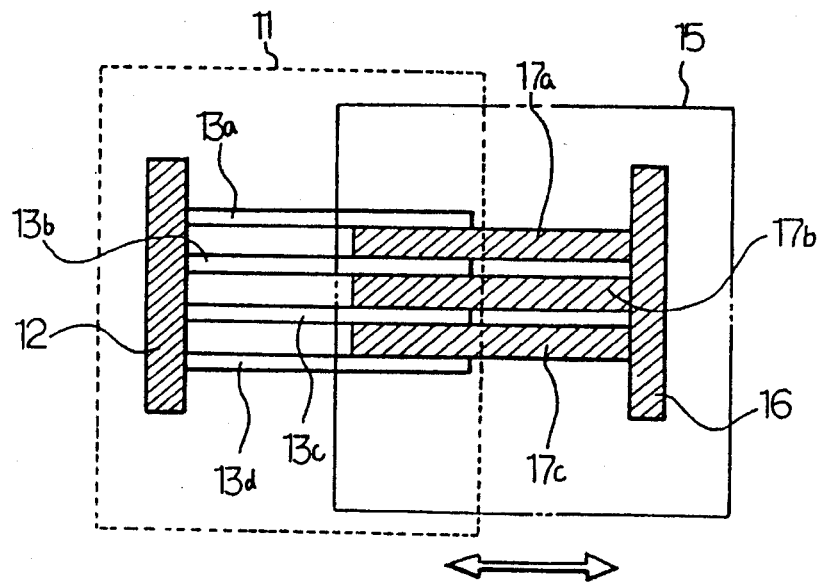
FIG. 5 illustrates a construction view of a rotation sensing device for a fine displacement of a handle according to another embodiment of the present invention.

FIG. 5 shows a schematic view of the rotation sensing device according to another embodiment of the present invention, in which the fixing member 11 with the polarity plates 13a to 13d and the dielectric member 15 with the dielectric plates 17a to 17c are rectilinearly telescoped and can be moved to each other. In this embodiment, a rectilinear displacement is detected instead of the rotational displacement, and other construction and operation is just similar to those of the first embodiment described in the above, thus to be omitted.

As described in the above, the rotation sensing device and the control system of the present invention are applicable to the electrical power steering devices for vehicles and motor driving devices with maximum accuracy.

What is claimed is:

1. A rotation sensing device for detecting a fine displacement of a handle shaft in an electrical power steering device comprising:

a fixing member having a support plate and a plurality of polarity plates fixed to one side of said support plate, each of said polarity plates being spaced at a predetermined interval; and a dielectric member having a plurality of dielectric plates fixed to one side of said handle shaft, each of said dielectric plates being spaced at a predetermined interval and inserted into the interval between each of said polarity plates, whereby a capacitance of said dielectric member varies based on a mechanical displacement of said handle shaft, and wherein said handle shaft is inserted along cutout portions formed at one side of each of said polarity plates.

2. A control system in an electrical power steering device, comprising:

a variable capacitance rotation sensor, having a fixing member consisting of a support plate and a plurality of polarity plates, and a dielectric member consisting of a plurality of dielectric plates for varying the capacity of said sensor in response to the displacement of a handle shaft of said electrical power steering device;

an oscillator for generating an output voltage proportional to said variable capacitance of said rotation sensor;

a reference voltage generator for generating a reference voltage comprised of triangular waveforms, an amplitude limiter connected to said oscillator for reducing noise from the output voltage of said oscillator;

a filter connected to said amplitude limiter for passing only an output voltage from said oscillator within a predetermined frequency band;

a voltage controlled oscillator connected to said filter and for generating a voltage proportional to an input signal from said filter;

a differential circuit connected to said voltage controlled oscillator for differentiating the output voltage from said voltage controlled oscillator with respect to time;

a comparator for comparing an output voltage of said differential circuit with said reference voltage and for generating a predetermined signal when said output voltage of said differential circuit is greater than said reference voltage; and a microprocessor for controlling a switching unit to determine the operation of a load in response to said signal from said comparator.

* * * * *